Figure 1:
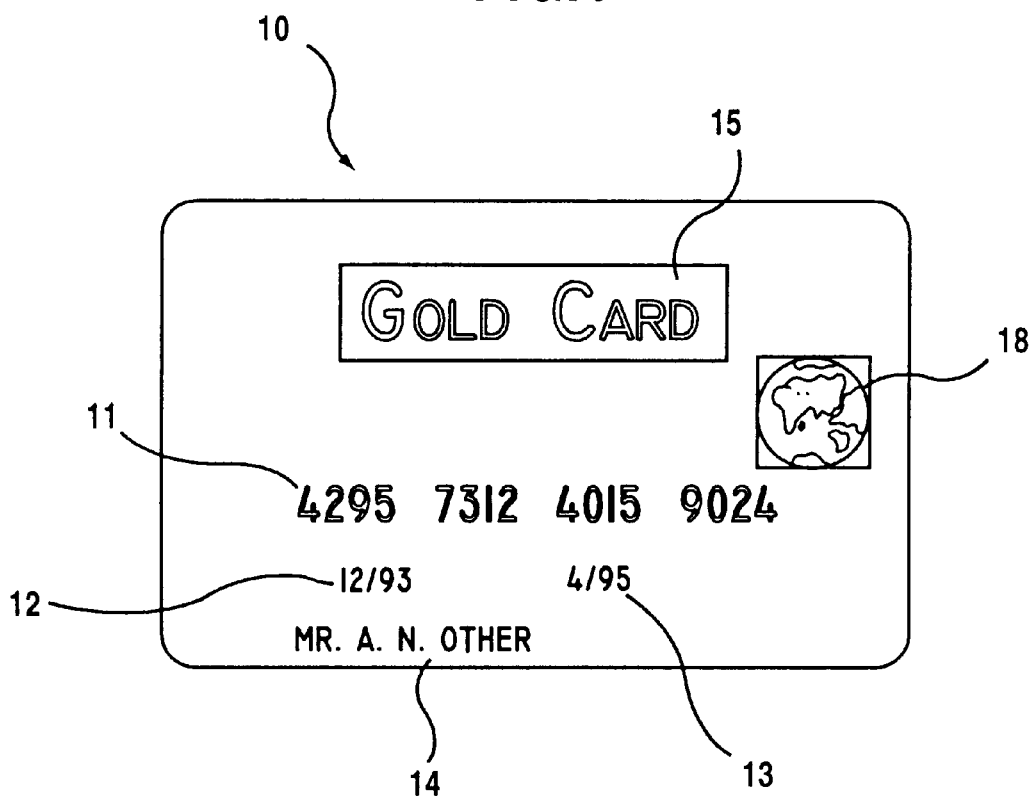

United States Patent

Roberts

Patent Number: 6,025,283
Date of Patent: Feb. 15, 2000

[54] CHARGE CARD

[75] Inventor: William Sherbrooke Roberts, Conwy, United Kingdom

[73] Assignee: The Real Gold Card Company Limited, Bodelwyddan, United Kingdom

[21] Appl. No.: 09/077,311

[22] PCT Filed: Dec. 5, 1996

[86] PCT No.: PCT/GB96/03008

§ 371 Date: Dec. 14, 1998

§ 102(e) Date: Dec. 14, 1998

[87] PCT Pub. No.: WO97/20692

PCT Pub. Date: Jun. 12, 1997

[30] Foreign Application Priority Data

May 12, 1995 [GB] United Kingdom .................. 9524860
Jul. 31, 1996 [GB] United Kingdom .................. 9616049

[51] Int. Cl.$^7$ .................................................. B32B 15/14
[52] U.S. Cl. ................................... 442/15; 442/6; 442/19; 442/52; 442/22; 442/37; 442/65; 442/260; 442/261; 442/232; 257/679; 283/904; 400/127; 428/75; 428/465; 428/548; 428/607; 428/615

[58] Field of Search ................................ 283/904; 257/679; 400/127; 428/548, 607, 615, 75, 465; 442/260.6, 261, 52, 104, 19, 105, 65, 15, 22, 37, 232

[56] References Cited

U.S. PATENT DOCUMENTS

| | | | |
|---|---|---|---|
| 3,975,574 | 8/1976 | Saluke | 428/483 |
| 4,687,231 | 8/1987 | Hartmann | 283/82 |
| 5,120,589 | 6/1992 | Morikawa et al. | 428/76 |
| 5,259,649 | 11/1993 | Shomron | 283/114 |
| 5,480,685 | 1/1996 | Sukuzki et al. | 427/548 |
| 5,688,738 | 11/1997 | Lu | 503/227 |
| 5,890,743 | 4/1999 | Garrison et al. | 283/109 |
| 5,892,661 | 4/1999 | Stafford et al. | 361/737 |

*Primary Examiner*—Terrel Morris
*Assistant Examiner*—Arti Singh
*Attorney, Agent, or Firm*—Nikaido, Marmelstein, Murray & Oram LLP

[57] ABSTRACT

A charge card is described which is made from a rubber or plastic laminate with precious metal forming the upper surface and preferably lower surface. The precious metal layers are adhered to the rubber material by means of a suitable adhesive formulation or the plastic materially a latex adhesive. The laminated card has uniquely flexible properties which render it suitable as a credit card.

17 Claims, 2 Drawing Sheets

CHARGE CARD

The present invention relates to charge cards. For the avoidance of doubt the term charge card used herein embraces all possible kinds of card used in lieu of payment in cash or cheque. Examples of such cards include credit cards such as VISA (Trade Mark), AMERICAN EXPRESS (Trade Mark) and many cards for use in specific shops or debit cards such as SWITCH (Trade Mark).

It is conventional to make charge cards from flexible plastic material. The material has to undergo rigorous testing to meet the international regulations, especially those governing flexibility and extent of elastic deformability. Some types of charge card are very exclusive. It is quite common for such cards to have a gold or platinum coloured coating on the faces thereof. These so-called gold or platinum cards are very prestigious and are usually only given to persons with sufficient assets or income.

A noble metal card has been described in a Japanese patent application (publication no. 3266695). This card is protected by thermally bonding transparent resin films to both surfaces of the noble metal card. Unfortunately, it is not possible to use such cards as credit cards. Credit cards require a high degree of flexibility and elasticity if they are to meet the required standards and the noble metal card described in the Japanese application deforms relatively easily but does not possess the required flexibility to return it to its original position. Instead, the metal layer becomes permanently damaged as a result of the deformation. The present invention is directed, in part, to a solution to this problem.

According to the present invention there is provided a charge card made partly from a precious metal wherein the card includes one or more layers made of a precious metal and one or more layers made of other materials characterised in that the card comprises a layer of a rubber based material.

For the avoidance of doubt, a rubber based material includes: natural rubber and synthetic rubbers and material s containing a substantial part of either rubber. Examples of synthetic rubbers include neoprene, isoprene, butadiene and copolymers of these substances. A composite material having an internal fibre or fabric web can be used. One example is polychloropropene coated fibre fabric of plain weave construction. Such composite materials combine flexibility and added strength. Other rubber based composites fall within the scope of this invention.

The term precious metal used herein includes high value metals such as platinum, gold (at all carats) and silver.

Preferably, a three part laminate is formed comprising outer layers of precious metal and an inner layer of the rubber based material. The layers of precious metal are, preferably, banded to the inner rubber based layer by means of a suitable adhesive. Such adhesives are known to those skilled in the art.

The card may be coated with a suitable coating to give a durable, flexible and rugged finish. Advantageously, optional further components of the card such as a hologram, a signature pad, a magnetic strip, a photograph identification strip and a card company identifier can be affixed to the coated layer which may be of plastic material is more suitable than the surface of the precious metal itself.

A preferred embodiment is acrylic isocynate which is a clear plastic typically sprayed onto the card. This coating allows banding of a signature patch etc to it.

Advantageously, the provision of a rubber based layer adjacent to the thin layer(s) of metal sheet results in an unique feel to the card and gives the flexibility to the card necessary to mimic the feel of a credit card. In addition, in the three part laminate, the provision of the inner rubber based layer gives flexibility whilst retaining the appearance of a solid metal card. In particular, the card is sufficiently elastic to allow a surprisingly high degree of deformation. In addition, the rubber based layer gives enhanced slip properties to the product. Slip properties are crucial in preventing the creasing or folding of the acting inner metal layer and in preventing stretching of the acting outer metal layer during flexion. The rubber based layer naturally deflects the stresses at the interface of the inner surface of the outer metal layer and the surface of the rubber based layer into the interior of the rubber based layer and thus considerably reduces the stresses at the interface. The reduced stress at the interface prevents the metal layer from separating from the rubber based layer and damaging the card.

A further unexpected advantage of the metal/rubber combination is the overall feel of the charge card and its considerable degree of flexibility. The use of the same plastic material as that used in ordinary credit cards does not impart sufficient flexibility to the precious metal layers and results in a more brittle and easily damaged card. As the edges of the rubber layer can be masked at the peripheral edge of the card it is possible to present the appearance of, for example, a solid gold card with an uniquely flexible feel which adds to the attractiveness of the card.

The layered charge card in accordance with the present invention may be provided with the usual "information" presented thereon, including the signature of the card owner and his photographic representation as well as other details such as the card number, expiry date and the hologram. This Information may be presented on one or both outer surfaces of the inner rubber based layer and may be seen through windows in the outer precious metal layers. Alternatively and preferably, it may be presented on the outer metal layers themselves, for instance, by suitable engraving processes including laser etching processes or alternatively by stamping processes. A further alternative and most preferred method is to apply a protective coat to the metal layers end apply the further details to the coating. Combinations of these methods may be also utilised.

As indicated previously, a preferred charge card in accordance with the present invention includes an inner rubber based layer and outer gold layers. The total thickness of the card is typically the same order of thickness (0.760 mm) as that of a conventional charge card.

A laminated charge card in accordance with the present invention may be in the form of an inner rubber layer and outer layers of gold or other suitable precious metal, the gold may extend around the edges of the charge card to conceal the presence of the inner rubber layer.

Uniquely, the invention thus solves the problem of providing a "real" precious metal charge card with the flexible and resilient properties expected of an ordinary charge card.

In an alternative embodiment, a layer of plastics material bonded to a layer of precious metal by latex adhesive can be envisaged.

The plastic layer can be the same sort of plastics as that used in conventional credit cards.

In a three part laminate, two layers of precious metal are bonded to the inner plastics layer by means of a latex adhesive. Preferably the latex adhesive is in a continuous layer between the plastics layer and metal layer, though it may be not continuous.

Advantageously, the card may be coated with a polyurethane lacquer to give a durable, flexible and rugged finish.

Advantageously, the provision of a central plastic layer sandwiched between thin outer layers of metal sheet effectively retains many of the plastic qualities in the card while retaining the genuine appearance of a precious metal card. In addition, the provision of a laminate improves flexibility whilst retaining the appearance of a solid metal card. In particular, the card possesses flexibility and is sufficiently elastic to allow a high degree of deformation. The latex adhesive adds to the flexibility of the laminate and gives enhanced slip properties to he product. Slip properties are crucial in preventing the creasing or folding of the inner metal layer and in preventing stretching of the outer metal layer during flexion.

Common adhesives, although adequate for some purposes, have insufficient long term durability under different conditions to maintain adhesion of the layers. This results in peeling of the metal layer, usually at the edges, with resultant tearing and other damage. This problem is overcome by providing outer protective layers of a polyurethane lacquer.

The preferred laminated charge card in accordance with the present invention may be provided with the usual "information" presented thereon, including the signature of the card owner and his photographic representation as well as other details such as the card number, expiry date and the hologram. This information may be presented on one or both outer surfaces of the inner plastics layer and may be seen through windows in the outer precious metal layers. Alternatively and preferably, it may be presented on the outer metal layers themselves, for instance, by suitable engraving processes including laser etching processes or alternatively by stamping processes.

A particular preferred charge card in accordance with the present invention includes an inner plastics layer and outer gold layers. The total thickness of the card is typically the same order of thickness (around 0.8 mm though the ISO standard of 0.76 mm is preferred) as that of a conventional charge card.

A laminated charge card in accordance with the present invention may be in the form of an inner plastics layer and outer layers of gold or other suitable precious metal, the gold may extend around the edges of the charge card to conceal the presence of the inner plastics layer. Alternatively, to provide extra strength a perimeter gasket may extend around and partially overlap the edges of the charge card. It may also peripherally overlap the faces of the charge card to the extent that it conceals the edges of the precious metal layers and thus significantly reduces the likelihood of peeling.

Preferably, a stamping process is employed to conceal the edges of the inner layer with the precious metal sheets. The stamps are concavely curved at the edges so as to force overlapping edges of the precious metal sheet towards the edges of the plastic. In this manner the overlapping edges of the lower and upper layer are forced toward each other during the stamping process so as to meet and effectively conceal the inner plastic layer. Care has to be taken so that the edges of the precious metal sheets do not abut against edges of the plastic layer and thus hinder the flexibility and slip properties provided by the sandwiched arrangement of the layers.

Figure 2:
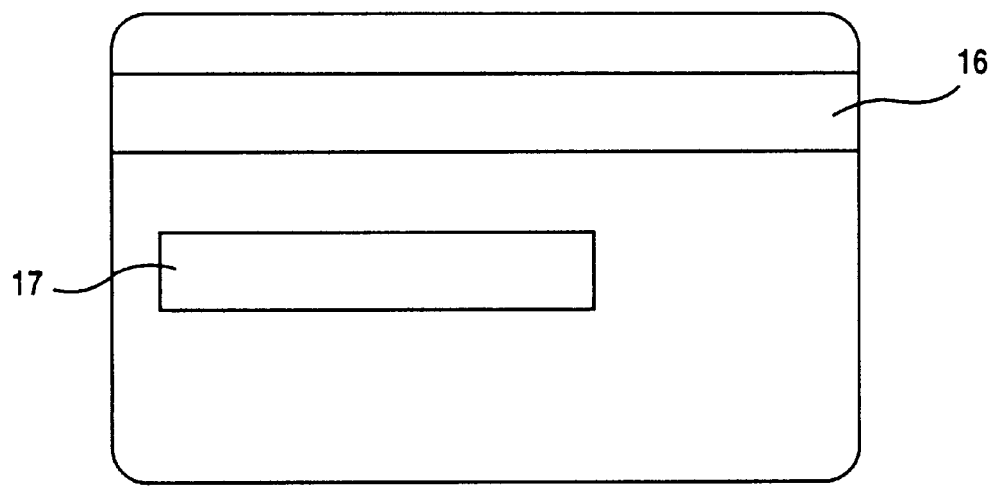
Figure 3:
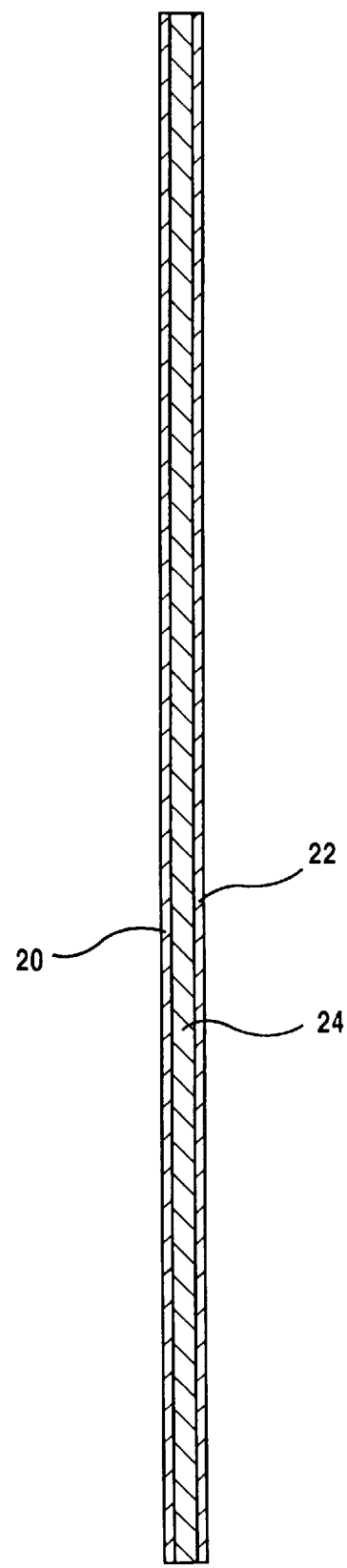

In order that the present invention may be more readily understood a specific embodiment thereof will now be described by way of example only with reference to the accompanying drawings in which:

FIG. 1 shows one face of a charge card in accordance with the present invention; and FIG. 2 shows the reverse face of the charge card of FIG. 1; and FIG. 3 illustrates a cross section of the charge card of FIGS. 1 and 2.

Referring to the drawings a charge card 10 is made to conventional size (55 mm×86 mm×0.76 mm) in a forge from a precious metal such as gold, which are then placed to sandwich a rubber sheet to charge card dimensions. The gold layers are each 200 micron thick and the rubber layer is 360 micron thick. The outer precious metal layers 20, 22 are bonded to the inner layer 24 by means of a suitable adhesive.

Inner layer 24 can be rubber, or a rubber based composite such as double faced neoprene (polychloropropene) coated fibre fabric of plain woven construction.

Alternatively, inner layer 24 could be of plastics material and latex adhesive in a continuous, or periodic, layer could be used.

A thin coat of the adhesive is applied to the inner layer prior to forging. Highly polished gold layers are adhered to the inner layer and the five layer laminate structure is pressed together under heat in a heat press. It is thought that this results in a change in the molecular structure of the inner rubber layer and adhesive to form a key bonding agent for adhering with the gold. Thereafter the cards are stamped out to appropriate dimensions. Variations in these thicknesses can be effected and these may be necessary in order to comply with ISO standards for charge cards. The variations in thicknesses may also be necessary in order to accommodate the final coating of, for example, acrylic isocynate or polyurethane lacquer on the charge card without exceeding the ISO standard thickness.

Alternatively, and particularly when a rubber inner layer is provided, the coating is any suitable transparent plastic material such as acrylic isocynate which will have minimum effect on the clarity of the gold layer as seen in the final card. Generally, the coating is baked on to encapsulate the card. Auxiliary card elements such as the hologram, magnetic strip and, if necessary, the signature patch are adhered to the plastic coating layer. Or, where a polyurethane lacquer is used, this sane formulation can be used to adhere the hologram, magnetic strip etc to the gold layers, the polyurethane lacquer gives a durable flexible and rugged finish. A preferred coating is clear acrylic isocynate which allows bonding of a signature patch etc and is less prone to cracking on flexing.

Laser etching is used to etch the gold to high definition and, optionally, the signature of the user may be laser etched or provided in the conventional manner by a signature patch and photograph. The account numbers and name of the card holder are embossed onto the gold layer. Advantageously, to conform with ISO standards, the card can be milled out to provide a recess of 600 micron to accommodate SMART card technology and can thereafter be embossed. The recess could be provided by milling using conventional mechanical technology or laser etching, or by forming an aperture in the layers prior to lamination. Tests have shown that the peel strength is an important factor if the card is to meet the required ISO, European and British standards. The number 11 attached to the card, the dates 12,13 of first validity and expiry and the name 14 of the card owner are all embossed into card.

Prior to-coating, due to the use of precious metals, the cards are assayed at the Assay Office in the United Kingdom or at the appropriate office in other countries.

The brand 15 of the particular type of card is etched onto the gold layer of the card prior to coating or printed onto he plastic cover by screen printing and laser etching or stamping. The magnetic strip 16 is attached to the rear of the coated card using adhesive. A signature patch 17 for the authorised signature of the card owner is likewise attached to the rear of the card using adhesive. It is conventional to secure holograms to charge cards in order to prevent forging. Such a hologram 18 may be secured in place on the coated card by adhesive as described.

It is to be understood that the above described embodiment has been made by way of illustration only. Many modifications and variations are possible. For example the dimensions of the card can be different, in particular the thickness. The thickness of the card is ideally in the range from 0.25 mm to 1 mm.

I claim:

1. A charge card made partly from gold, silver or platinum and one or more layers made of other materials characterized in that the card comprises a layer of a rubber based composite material having an internal fabric or fibre web, one or more layers made of gold, silver or platinum sheet and the rubber based composite layer is adjacent the layer of gold, silver or platinum sheet.

2. A charge card according to claim 1, in which the card is formed from a three layer laminate including outer layers of gold, silver or platinum and an inner layer comprising the rubber based composite material.

3. A charge card according to claim 2, in which the inner layer of rubber based composite material is of greater thickness than each of the outer layers of gold, silver or platinum.

4. A charge card according to claim 3, in which the inner layer of rubber based composite material is substantially equal to 360 microns in thickness and/or the outer layers of metal are substantially equal to 200 microns in thickness.

5. A charge card according claim 1, in which the rubber based composite layer is bonded to the gold, silver or platinum layer by a suitable adhesive.

6. A charge card according claim 1, in which the rubber based composite material comprises a synthetic rubber.

7. A charge card according to claim 6, in which the synthetic rubber is polychloropropene.

8. A charge card according to claim 1, in which the composite material comprises a polyester or nylon fibre fabric.

9. A charge card according to claim 8, in which the composite material comprises polychloropropene coated polyester fibre fabric.

10. A charge card according to claim 8, in which the fibre fabric is of plain weave construction.

11. A charge card made partly from gold, silver or platinum and one or more layers made of other materials characterised in that the card comprises a layer of a rubber based material and in which the rubber based material is a latex adhesive and a layer of a plastic material is bonded to a layer of the gold, silver or platinum with the adhesive.

12. A charge card according to claim 11, in which the card is formed from a three part laminate including outer layers of gold, silver or platinum and an inner layer of a plastic material.

13. A charge card as claimed in claim 11, wherein a coating of polyurethane lacquer or acrylic isocynate or a transparent coating of plastic is applied to provide the exterior finish for the card.

14. A charge card according to claim 11, in which the card is formed from a three layer laminate, having an inner rubber composite layer and outer gold, silver or platinum metal layers, the outer layers extending around the edges of the inner layer to conceal its presence.

15. A charge card according to claim 14, in which the edges of the outer metal layers overlap about the edge of the inner layer.

16. A charge card according to claim 15, in which the overlapping edges of the metal layers do not abut the edge of the plastics layer.

17. A charge card according to claim 11, in which a perimeter gasket extending around and partially overlapping the edges of the card is provided.

* * * * *